United States Patent
Irie

(10) Patent No.: US 7,274,360 B2
(45) Date of Patent: Sep. 25, 2007

(54) MULTIPLE CONTROL SYSTEM

(75) Inventor: Toshiaki Irie, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 345 days.

(21) Appl. No.: 10/616,071

(22) Filed: Jul. 9, 2003

(65) Prior Publication Data
US 2004/0032404 A1 Feb. 19, 2004

(30) Foreign Application Priority Data
Aug. 19, 2002 (JP) ............................ P2002-237757

(51) Int. Cl.
G09G 5/00 (2006.01)
(52) U.S. Cl. ..................................... 345/204; 345/502
(58) Field of Classification Search ................ 345/502, 345/504, 1.1, 520, 2.1, 3.1, 204, 505; 713/375; 368/13–14, 241–242; 386/45, 100, 125, 386/70, 80, 105, 46, 126, 1, 13, 14
See application file for complete search history.

(56) References Cited

U.S. PATENT DOCUMENTS

| 4,647,973 | A | | 3/1987 | Deiss ......................... 358/181 |
| 4,942,391 | A | * | 7/1990 | Kikuta ........................ 345/634 |
| 5,561,478 | A | | 10/1996 | Machado ..................... 348/706 |
| 5,638,346 | A | * | 6/1997 | Aramaki .................. 369/30.09 |
| 5,796,538 | A | * | 8/1998 | Ji et al. ........................ 360/71 |
| 5,801,674 | A | * | 9/1998 | Shimizu ...................... 345/103 |
| 5,887,112 | A | * | 3/1999 | Gedl ............................. 386/71 |
| 6,345,323 | B1 | * | 2/2002 | Beasley et al. ................ 710/38 |
| 2002/0168172 | A1 | * | 11/2002 | Kim ............................. 386/46 |
| 2003/0021586 | A1 | * | 1/2003 | Suh ............................. 386/95 |

FOREIGN PATENT DOCUMENTS

| JP | 05265389 A | * | 10/1993 |
| JP | 6-274134 | | 9/1994 |
| JP | 08006581 A | * | 1/1996 |
| JP | 08088838 A | * | 4/1996 |
| JP | 08275286 A | * | 10/1996 |
| JP | 09005364 A | * | 1/1997 |
| JP | 11-344985 | | 12/1999 |

OTHER PUBLICATIONS

European Search Report Ref. EP27853-035/Peu dated Dec. 30, 2003 (3 pages).
Patent Abstracts of Japan, Publication No. 06-274134, Sep. 30, 1994, 2 pgs.
Japanese Office Action for Japanese Application No. 2002-237757, mailed on Aug. 17, 2005 with English translation thereof (4 pages).

* cited by examiner

Primary Examiner—Kent Chang
(74) Attorney, Agent, or Firm—Osha Liang LLP

(57) ABSTRACT

A first controller and a second controller for controlling corresponding electronic devices, which are incorporated in a composite electronic apparatus, are connected in parallel to a display driver via a serial communication line. When the first controller controls the display driver, the first controller outputs a first control signal to the second controller so as to put a three-state output terminal of the second controller in a high impedance state. When the first controller does not control the display driver, the first controller outputs a second control signal to the second controller so as to allow the second controller to control the display driver, and puts a three-state output terminal thereof in a high impedance state.

6 Claims, 3 Drawing Sheets

MULTIPLE CONTROL SYSTEM

BACKGROUND OF THE INVENTION

1. Field of the Invention

The present invention relates to a multiple control system for a composite electronic apparatus in which a plurality of electronic devices are incorporated, and more particularly to a multiple control system for driving individually a display element used commonly by the plurality of electronic devices.

2. Description of the Related Art

In general, a display unit is provided in a composite electronic apparatus in which a plurality of electronic devices are incorporated for common use by the respective electronic devices. The display unit is connected to one of the plurality of electronic devices, so that the electronic device so connected to the display unit allows display data such as operating conditions of the other electronic devices to be displayed on the display unit. FIG. 4 shows a conventional example. In FIG. 4, a microcomputer 11 is directly connected to a driver IC 13, whereby the microcomputer 11 sends a display data signal to the driver IC 13 so as to control the driver IC 13 to control, in turn, a display element 14, so that display data can be displayed on the display unit 14. Since a microcomputer 12 is not directly connected to the driver IC 13, the microcomputer 12 sends a display data signal to the microcomputer 11, and the microcomputer 11 then receives the display data signal. Then, the microcomputer 11 sends the display data signal to the driver IC 13, so that the display data can be displayed on the display unit 14. The conventional example shown in FIG. 4 will be described in greater detail.

Namely, what is shown in FIG. 4 is a block diagram of a main part of a so-called dual deck (a composite video recording and reproducing apparatus) having both a reproducing capability from a DVD (Digital Versatile Disc) and a recording and reproducing capability on and from a VHS tape. A schematic perspective view of an external appearance of the dual deck is shown in FIG. 5.

In FIG. 5, reference numeral 15 denotes a reproducing functional part capable of reproducing from a DVD, reference numeral 16 a recording and reproducing functional part capable of recording and reproducing on and from a VHS tape, and reference numeral 14 a common display panel (a display element) for displaying various conditions (a reproducing position, fast feeding and rewinding) of the DVD reproducing functional part 15 and the VHS recording and reproducing functional part 16.

Then, the microcomputer 12 shown in FIG. 4 is a microcomputer for united control of the DVD reproducing functional part 15 and the microcomputer 11 is a microcomputer for united control of the VHS recording and reproducing functional part 16.

In a case where a reproducing from a certain DVD is being executed in the DVD reproducing functional part 15, a reproducing position on the disc is displayed on the display panel 14 in such a form of "1:10:30" (1 hour, 10 minutes, 30 seconds), and in a case where a certain VHS tape is being fed fast in the VHS recording and reproducing functional part 16, a display such as "FF" (fast forward) is displayed on the display panel 14.

As an apparatus configured such that a plurality of microcomputers send a display data signal directly to a driver IC for driving a display element, there has been proposed an apparatus as disclosed in, for example, JP-A-6-274134 which is configured such that a clock signal for a liquid crystal display and a synchronous signal for frame synchronization are sent from a microcomputer to another microcomputer and clock signals and synchronous signals outputted from the two microcomputers are synchronized with each other, so that the two microcomputers each installing therein a driver IC perform their own shared responsibilities to simultaneously drive the liquid crystal display element having a number of pixels.

Of the aforesaid examples described with respect to the related art, however, in the former example (shown in FIGS. 4 and 5), while the display data such as the operating conditions of the respective microcomputers can be displayed on the display element via the single microcomputer, a data signal line and a control signal line for sending the display data signal and the control signal from the microcomputer 12 to the microcomputer 11, respectively, are needed. In particular, in the event that the display data signal and the control signal are sent via a serial communication with a small number of data signal lines and control signal lines, there is caused a problem that a communication control is required for sending and receiving signals such as the display data signal.

The problem with the former example will be described in greater detail.

Namely, while the driver IC 13 outputs a drive signal for driving the display element 14 towards individual grids or segments of the display element that are to be illuminated, the contents of the output thereof are outputted from the microcomputer 11 towards the driver IC 13 as serial data. The serial data outputted towards the driver IC 13 are created within the microcomputer 11.

For example, in the event that the "FF" is attempted to be displayed on the display element 14 with the VHS recording and reproducing functional part 16 performing a fast feeding operation of the VHS tape, the microcomputer 11 converts the display "FF" which indicates the current operating condition (fast feeding condition) of the VHS recording and reproducing functional part 16 which is recognized by the microcomputer itself into data (data of the grids or segments) that can be received by the driver IC 13 and outputs the data so converted to the driver IC 13. Since the microcomputer 11 is originally such as to govern the united control of the VHS recording and reproducing functional part 16, although the microcomputer 11 allows the various conditions of the VHS recording and reproducing functional part 16 to easily be displayed on the display element as has been described above, it is not easy to enable the display of the conditions of the DVD reproducing functional part 15 via the microcomputer 11.

Assuming that, for example, the DVD reproducing functional part 15 is implementing a reproducing from a position of 1 hour, 10 minutes and 30 seconds on a disc, in the event that the microcomputer 12 wants to display "1:10:30" on the display element 14 via the microcomputer 11, the following will happen.

That is, while the microcomputer 12 outputs data to the microcomputer 11 to cause the microcomputer 11 to output the data towards the driver IC 13 so as to enable the display of "1:10:30" on the display element 14, in order for the microcomputer 11 to recognize correctly the data outputted from the microcomputer 12 to the microcomputer 11, in addition to the function to display the operating conditions of the VHS recording and reproducing functional unit 16, a function to display the operating conditions of the DVD reproducing functional part 15 needs to be provided within the microcomputer 11. In the case of the system shown in FIG. 4, the microcomputer 11 needs the function to recognize data relating to the conditions of the DVD reproducing functional part 15 which are inputted from the microcomputer 12 in addition to the function to output the conditions of the VHS recording and reproducing functional part 16 as the display data to be displayed on the display element.

In addition, even if the function as has just been described above is installed in the microcomputer 11, since the microcomputer 12 cannot output the data relating to the display of the conditions towards the microcomputer 11 while, for example, the microcomputer 11 is controlling the VHS recording and reproducing functional unit 16, information on the conditions of the microcomputer 11 needs to be inputted into the microcomputer 12 at all times (the microcomputer 12 side needs to recognize the conditions of the microcomputer 11 side at all times), a complicated control is needed for exchanging data between the microcomputer 11 and the microcomputer 12 (for example, a BUSY signal in FIG. 4).

Then, since the microcomputer 11 for controlling the VHS recording and reproducing functional part 16 is normally connected to another microcomputer (for example, a microcomputer for a TUNER), a control is needed for exchanging data between the microcomputer 11 and the another microcomputer. Thus, the control becomes further complicated.

In any case, in the system as shown in FIG. 4 in which a microcomputer for outputting the display data to the driver IC 13 is fixed to the single particular microcomputer 11, there is caused a drawback that the input and output of data into and from the microcomputer 11 becomes complicated.

In addition, in the latter example (disclosed in JP-A-6-274134), while the single display element can be driven via the driver ICs connected to the two microcomputers, respectively, there exists a problem that the data signal line and the control signal line are needed for sending and receiving display data signals and control signals between the two microcomputers. Additionally, while the two microcomputers are configured to directly drive the display element, the pixels of the display element are driven by the two microcomputers in a shared fashion, and the apparatus is not such that the display data such as the operating conditions of the two microcomputers are displayed on the display element by the two microcomputers, respectively.

SUMMARY OF THE INVENTION

The present invention was made in view of the problems inherent in the related art, and an object thereof is to provide a multiple control system that allows a plurality of electronic devices incorporated in a composite electronic apparatus to directly display on a single display device display data such as their own operating conditions individually without requiring a number of data and control signal lines between the plurality of electronic devices, as well as a complicated communication control between the plurality of electronic devices.

In order to achieve the above object, according to a first aspect of the invention, there is provided a multiple control system for controlling a display unit provided in a composite electronic apparatus having a plurality of electronic devices incorporated therein, the multiple control system including: a display driver adapted to drive the display unit; a first controller adapted to control one of the electronic devices and having a output selection terminal and a three-state output terminal connected to the display driver; and a second controller adapted to control another electronic device and having a output selection terminal connected to the output selection terminal of the first controller and a three-state output terminal connected to the display driver in parallel with the first controller, wherein when the first controller controls the display driver, the first controller outputs a first control signal to the second controller, and the second controller puts the three-state output terminal thereof in a high impedance state when the first control signal is received.

According to a second aspect of the invention, in addition to the first aspect of the invention, when the first controller does not control the display driver, the first controller outputs a second control signal to the second controller and puts the three-state output terminal thereof in a high impedance state, and the second controller controls the display driver when the second control signal is received.

According to a third aspect of the invention, in addition to the first aspect of the invention, the display driver is connected to the first controller and the second controller via a serial communication line.

In the multiple control system configured as described above, the plurality of electronic devices incorporated in the composite electronic apparatus are allowed to directly display on the single display unit display data such as their own operating conditions individually without requiring a number of data and control signal lines between the plurality of electronic devices, as well as a complicated communication control between the plurality of electronic devices.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
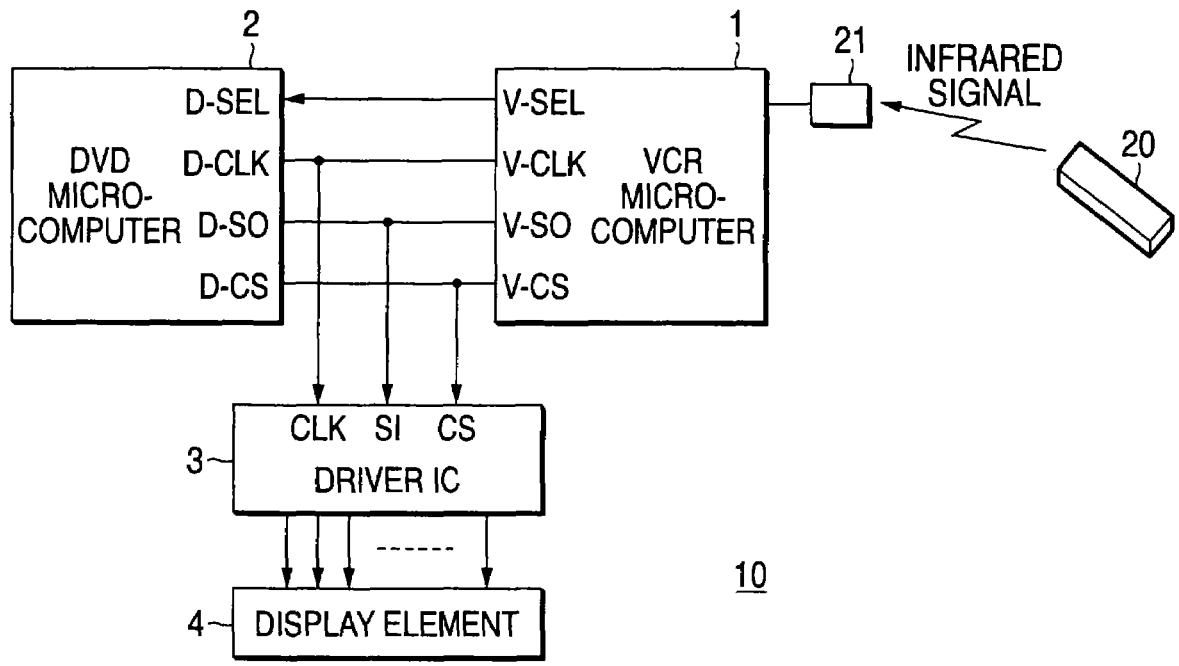
FIG. 1 is a block diagram showing the configuration of a multiple control system according to an embodiment of the invention.
Figure 6:
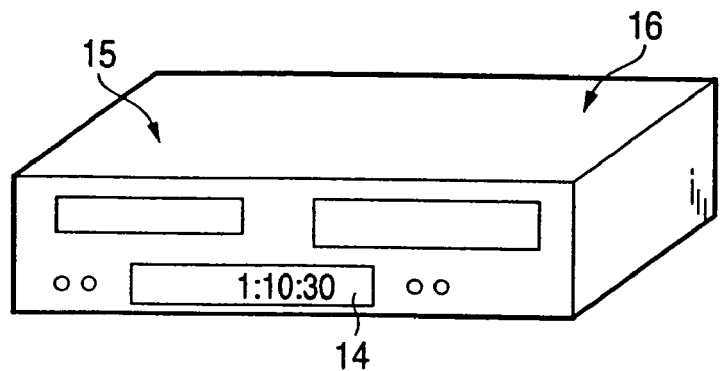
FIG. 6 is a drawing showing an external appearance of an electronic apparatus installing therein the multiple control system according to the invention.

FIG. 1 is a block diagram showing a configuration of a multiple control system according to an embodiment of the invention, and FIG. 6 is a schematic perspective view showing an external appearance of a composite video recording and reproducing apparatus that installs therein the multiple control system according to the embodiment.

A description will be made based on the block diagram shown in FIG. 1, which shows the configuration of the multiple control system according to the embodiment of the invention.

A multiple control system 10 includes a microcomputer (first controller) (hereinafter, referred to as a VCR microcomputer) 1 for controlling the entirety of a system 6 of a video cassette recorder (VCR) which records and reproduces a visual-audio signal on and from a video cassette tape, a microcomputer (second controller) (hereinafter, referred to as a DVD microcomputer) 2 for controlling the entirety of a system 5 of a DVD player which reproduces a visual-audio signal recorded on a DVD (Digital Versatile Disc), and a driver IC 3 (display driver) for driving respective segments off a display element (display unit) 4 so as to display thereon display data.

An output selection terminal (V-SEL) of the VCR microcomputer 1 and an output selection terminal (D-SEL) of the DVD microcomputer 2 are connected to each other. A chip selection terminal (V-CS) of the VCR microcomputer 1 and a chip selection terminal (D-CS) of the DVD microcomputer 2 are connected to a chip selection terminal (Cs) of the driver IC 3 in parallel. A serial output terminal (V-SO) of the VCR microcomputer 1 and a serial output terminal (D-SO) of the DVD microcomputer 2 are connected to a serial input terminal (SI) of the driver IC 3 in parallel. A clock terminal (V-CLK) of the VCR microcomputer 1 and a clock terminal (D-CLK) of the DVD microcomputer 2 are connected to a clock terminal (CLK) of the driver IC 3 in parallel.

The serial output terminals (V-SO), (D-SO), clock terminals (V-CLK), (D-CLK), and chip selection terminals (V-CS), (D-CS) of the VCR microcomputer 1 and the DVD microcomputer 2 are made to be three-state output terminals so that the respective output terminals and signal lines can be separated from each other when the three-state output terminals are put in a high impedance state.

Figure 7:
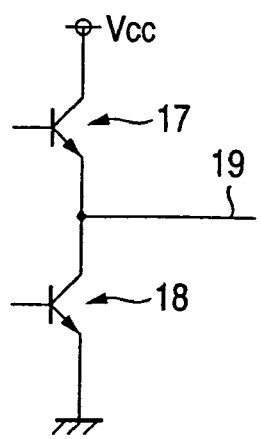
FIG. 7 is a circuit diagram showing an example of a three-state terminal.

An example of the three-state output terminal is shown in FIG. 7. Namely, the three-state terminal is designed such that one of two NPN transistors 17, 18 becomes ON whereas the other becomes OFF at the time of normal output, and a three-state output state is provided when the both transistors 17, 18 become OFF, which provides a similar state to a state in which a signal line 19 is connected nowhere.

An operation of the multiple control system that is configured as has just been described above will be described below.

When a VCR mode for selecting an output of a visual-audio signal from the VCR is selected by operating keys on a remote controller 20, the VCR microcomputer 1 of the multiple control system 10 sends out a VCR mode selection signal indicating that the VCR mode has been selected from the output selection terminal. (V-SEL) of the VCR microcomputer 1 to the output selection terminal (D-SEL) of the DVD microcomputer 2.

When receiving the VCR mode selection signal, the DVD microcomputer 2 puts the output terminals to the driver IC 3 or the chip selection terminal (D-CS), the serial output terminal (D-SO) and the clock terminal (D-CLK) in a high impedance state so as to separate the respective output terminals from signal lines.

When the DVD microcomputer 2 separates the connection with the driver IC 3, the VCR microcomputer 1 sends out a chip selection signal from the chip selection terminal (V-CS) of the VCR microcomputer 1 to the chip selection terminal (CS) of the driver IC 3 to select the driver IC 3, sends out a clock signal of a transmission timing signal of a display data signal from the clock terminal (V-CLK) of the VCR microcomputer 1 to the clock terminal (CLK) of the driver IC 3 and sends out a display data signal indicating such as an operating condition of the VCR from the serial output terminal (V-SO) of the VCR microcomputer 1 to the serial input terminal (SI) of the driver IC 3 so as to control the driver IC 3 to drive the display element 4, thereby making it possible to display the display data such as the operating condition of the VCR on the display element 4.

When a DVD mode for selecting an output of a visual-audio signal from a DVD is selected by operating the keys on the remote controller 20, the VCR microcomputer 1 of the multiple control system 10 sends out a DVD mode selection signal indicating that the DVD mode has been selected from the output selection terminal (V-SEL) of the VCR microcomputer 1 to the output selection terminal (D-SEL) of the DVD microcomputer 2 and puts the output terminals to the driver IC 3 or the chip selection terminal (V-CS), the serial output terminal (V-SO) and the clock terminal (V-CLK) in a high impedance state so as to separate the respective output terminals from signal lines, whereby only the DVD microcomputer 2 is allowed to be connected to the driver IC 3.

When receiving the DVD mode selection signal, the DVD microcomputer 2 sends out a chip selection signal from the chip selection terminal (D-CS) of the DVD microcomputer 2 to the chip selection terminal (CS) of the driver IC 3 to thereby select the driver IC 3, sends out a clock signal of a transmission timing signal of a display data signal from the clock terminal (D-CLK) of the DVD microcomputer 2 to the clock terminal (CLK) of the driver IC 3, and sends out a display data signal such as an operating condition of the DVD from the serial output terminal (D-SO) of the DVD microcomputer 2 to the serial input terminal (SI) of the driver IC 3 so as to control the driver IC 3 to drive the display element 4, thereby making it possible to display the display data such as the operating condition of the DVD on the display element 4.

As described above, while the VCR microcomputer 1 and the DVD microcomputer 2 are connected to the driver IC 3 in parallel, since the VCR microcomputer 1 and the DVD microcomputer 2 are allowed to be disconnected from the driver IC 3 by putting the output terminals of the VCR microcomputer 1 or the output terminals of the DVD microcomputer 2 which are both connected to the driver IC 3 in the high impedance state, the VCR microcomputer 1 and the DVD microcomputer 2 can individually control the IC driver 3 so as to drive the display element 4 to thereby display on the display element 4 display data such as operating conditions of the VCR microcomputer 1 and the DVD microcomputer 2, respectively, without needing a number of data and control signal lines and a complicated communication control between the VCR microcomputer 1 and the DVD microcomputer 2.

Figure 2:
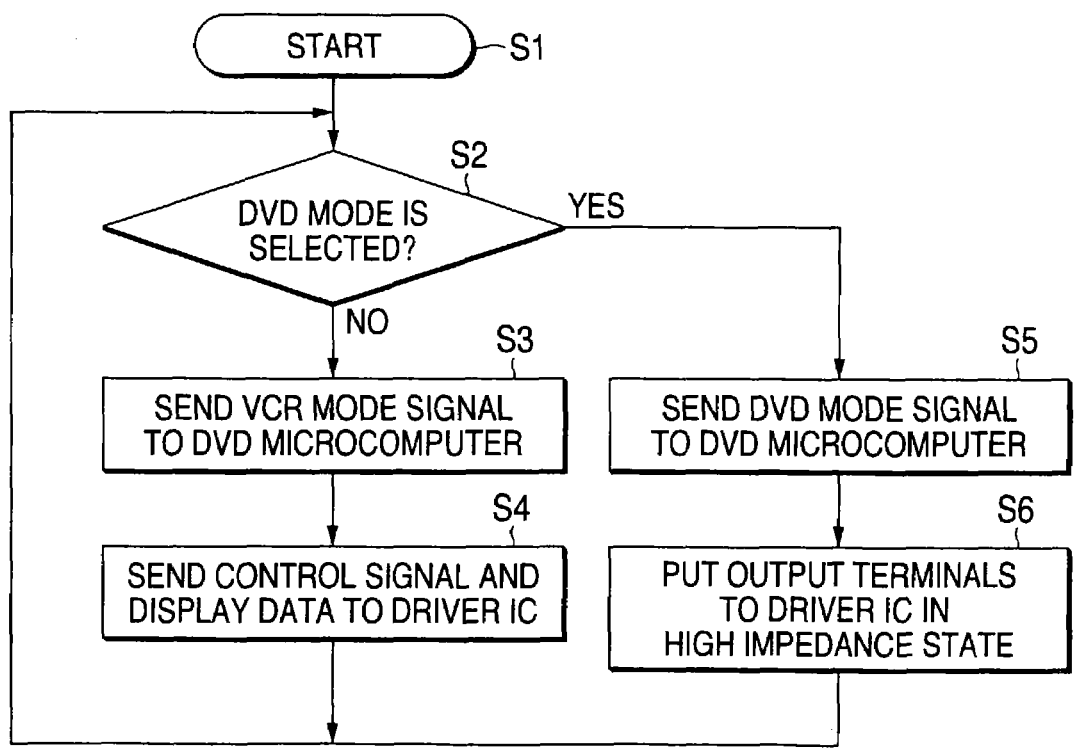
FIG. 2 is a flowchart showing an operation of a VCR microcomputer in the multiple control system according to the embodiment.

Hereinafter, a description will be made based on a flowchart shown in FIG. 2 which shows the operation of the VCR microcomputer 1 side of the multiple control system according to the embodiment.

When power is supplied to the multiple control system (step S1), whether or not the DVD mode for operating the DVD has been selected by operating the keys of the remote controller 20 is determined (step S2), and if the DVD mode is selected through the operation of the keys of the remote controller 20, then advance to step S5, whereas if the DVD mode is not selected through the operation of the keys of the remote controller or if the VCR mode for operating the VCR is selected, then advance to step S3.

In step S3, the VCR mode selection signal indicating that the VCR mode has been selected is sent out to the output selection terminal (D-SEL) of the DVD microcomputer, and then advance to step S4.

In step 4, the chip selection signal is sent out from the chip selection terminal (V-CS) to the driver IC so as to select the driver IC, and the display data signal and the clock signal are sent to the driver IC from the serial data output terminal (V-SO) and the clock terminal (V-CLK), respectively, and the display element is driven by the driver IC so that the display data such as the operating condition on the VCR side are displayed on the display element. Then, return to step S2 to repeat the steps from step S2.

In step S5, the DVD mode selection signal indicating that the DVD mode has been selected is sent out to the output selection terminal (D-SEL) of the DVD microcomputer, and then advance to step S6.

In step S6, the output terminals to the driver IC or the chip selection terminal (D-CS), the serial output terminal (D-SO) and the clock terminal (D-CLK) are put in a high impedance state so as to be separated from the signal lines, and then return to step S2 to repeat the steps from step S2.

Figure 3:
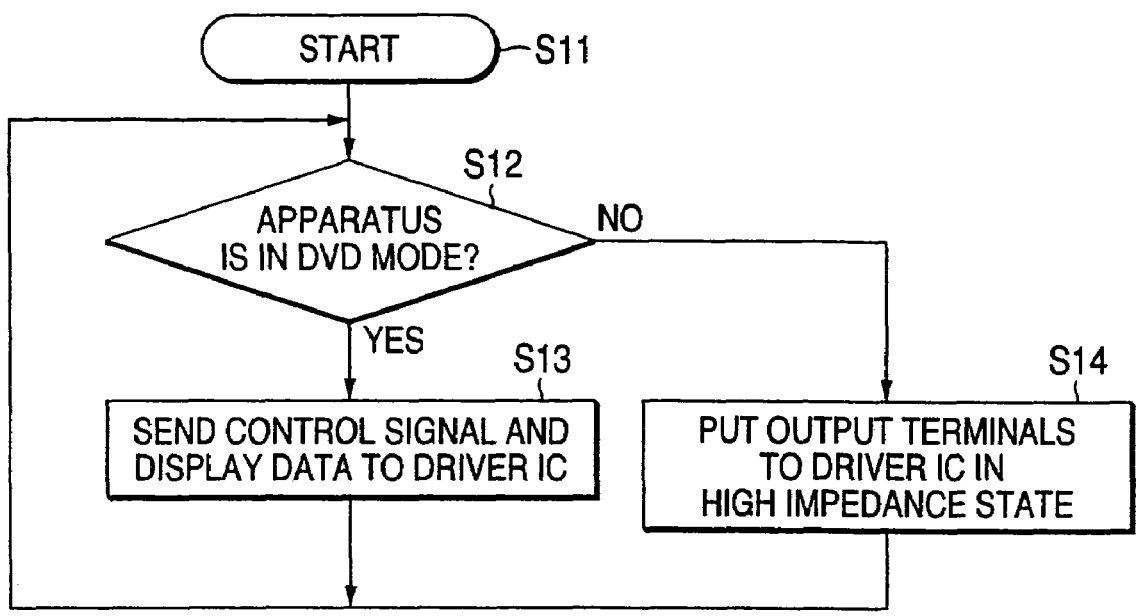
FIG. 3 is a flowchart showing an operation of a DVD microcomputer in the multiple control system according to the embodiment.
Figure 4:
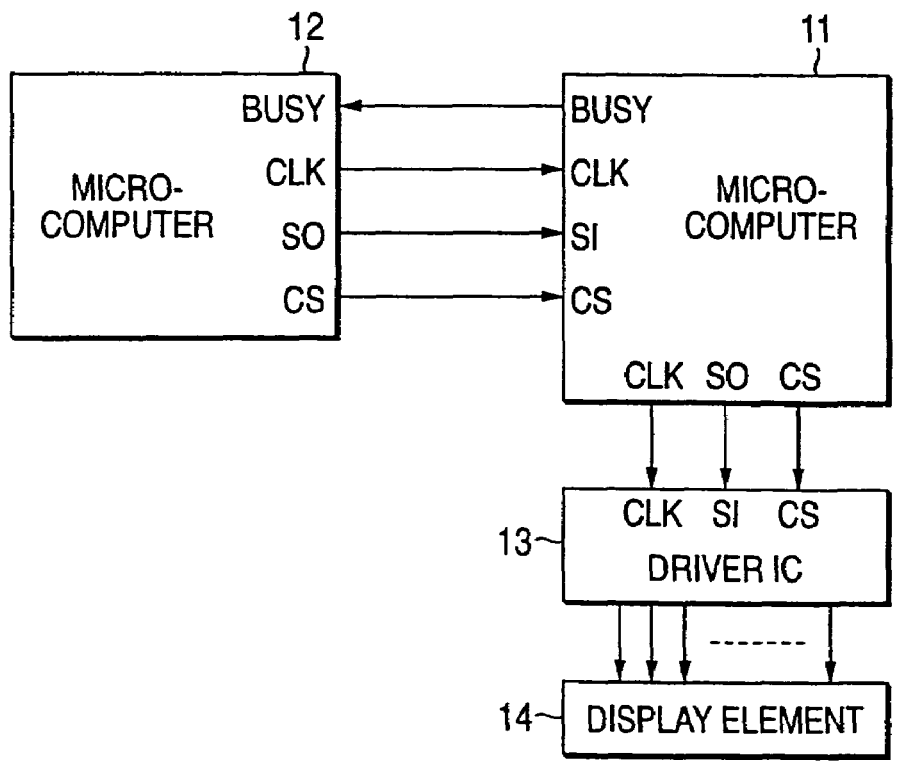
FIG. 4 is a block diagram showing an example of a configuration of a conventional multiple control system.
Figure 5:
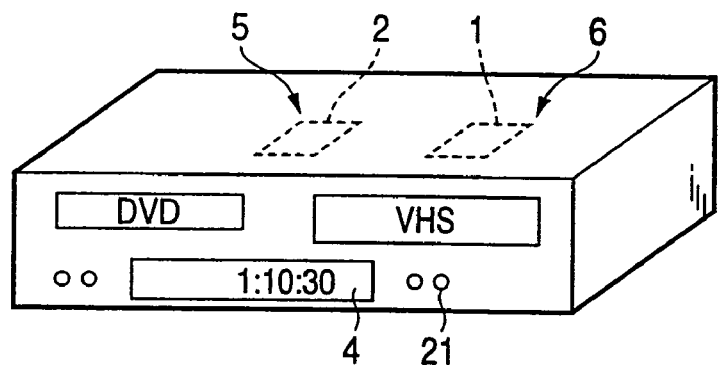
FIG. 5 is a drawing showing an external appearance of an electronic apparatus installing therein the conventional multiple control system.

Hereinafter, a description will be made based on a flow-chart shown in FIG. 3, which shows the operation of the DVD microcomputer side of the multiple control system.

When power is supplied to the multiple control system (step S1), whether or not the DVD mode selection signal sent from the VCR microcomputer has been received is determined (step S12). If the DVD mode selection has been received, advance to step S13, whereas if the DVD mode selection signal has not been received or if a VCR mode selection signal has been received, then advance to step S14.

In step S13, the chip selection signal is sent from the chip selection terminal (D-CS) to the driver IC so as to select the driver IC, and the display data signal and the clock signal are sent to the driver IC from the serial data output terminal (D-SO) and the clock terminal (D-CLK), respectively, whereby the display element is driven by the driver IC so that the display data such as the operation condition of the DVD side are displayed on the display element. Thereafter, return to step S12 to repeat the steps from step S12.

In step S14, the output terminals to the driver IC or the chip selection terminal (D-CS), the serial output terminal (D-SO) and the clock terminal (D-CLK) are put in a high impedance state so as to be separated from the signal lines, and then return to step S12 to repeat the steps from step S12. Note that the determination of whether or not the DVD is selected in step S2 is implemented within the VCR microcomputer 1. That is, a remote control signal receiving part 21 including an interface is connected to the microcomputer 1, and an infrared signal from the remote controller 20 is taken into the microcomputer 1 for determination thereby.

While the embodiment of the invention has been described in detail above, the invention is not limited thereto, and various modifications and improvements can be made by those skilled in the art to the described embodiment without departing from the sprit and scope of the invention. For Example, while the embodiment has been described based on the case where the single driver IC is controlled individually by the two microcomputers so that the display data of the respective microcomputers are displayed individually on the display element, the single driver IC may be controlled individually by a plurality of microcomputers so that display data of the respective microcomputers are displayed individually on the display element.

As has been described heretofore, according to the multiple control system of the invention, the two microcomput-ers for controlling the two electronic devices, respectively, are connected in parallel to the driver IC for driving the display element via the serial communication line, and when one of the microcomputers displays the display data thereof on the display element, a control signal is sent from the microcomputer to the other microcomputer so as to put the three-state output terminal of the other microcomputer in the high impedance state to thereby disconnect the other microcomputer from the driver IC for driving the display element, thereby making it possible to display the display data of the microcomputer on the display element. When the one of the microcomputers does not display the display data thereof the display element, the three-state output terminal of the microcomputer is put in the high impedance state so as to be disconnected from the driver IC for driving the display element, and a control signal is sent from the microcomputer to the other microcomputer so that the display data of the other microcomputer can be displayed on the display element. According to the above-described configuration, the plurality of electronic devices incorporated in the composite electronic apparatus are allowed to display the display data thereof such as their own operating conditions directly on the display element without needing of many data signal lines and control lines between the plurality of electronic devices, as well as the complicated communication control between the plurality of electronic devices.

Although the present invention has been shown and described with reference to specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A multiple control system for controlling a display unit provided in a composite electronic apparatus having a plurality of electronic devices incorporated therein, the multiple control system comprising:
    a display driver adapted to drive the display unit;
    a first controller adapted to control one of the electronic devices and having a output selection terminal and a three-state output terminal connected to the display driver via a serial communication line; and
    a second controller adapted to control another electronic device and having a output selection terminal connected to the output selection terminal of the first controller and a three-state output terminal connected to the display driver via a serial communication line in parallel with the first controller,
    wherein when the first controller controls the display driver, the first controller outputs a first control signal to the second controller, and the second controller puts the three-state output terminal thereof in a high impedance state when the first control signal is received, and
    wherein when the first controller does not control the display driver, the first controller outputs a second control signal to the second controller and puts the three-state output terminal thereof in a high impedance state, and the second controller controls the display driver when the second control signal is received.

2. A multiple control system for controlling a display unit provided in a composite electronic apparatus having a plurality of electronic devices incorporated therein, the multiple control system comprising:
    a display driver adapted to drive the display unit;

a first controller adapted to control one of the electronic devices and having a output selection terminal and a three-state output terminal connected to the display driver; and a second controller adapted to control another electronic device and having a output selection terminal connected to the output selection terminal of the first controller and a three-state output terminal connected to the display driver in parallel with the first controller, wherein when the first controller controls the display driver, the first controller outputs a first control signal to the second controller, and the second controller puts the three-state output terminal thereof in a high impedance state when the first control signal is received.

3. The multiple control system as claimed in claim 2, wherein when the first controller does not control the display driver, the first controller outputs a second control signal to the second controller and puts the three-state output terminal thereof in a high impedance state, and the second controller controls the display driver when the second control signal is received.

4. The multiple control system as claimed in claim 2, wherein the display driver is connected to the first controller and the second controller via a serial communication line.

5. An electronic apparatus comprising:
- a recording and reproducing functional part adapted to record and reproduce data stored in a tape storage medium;
- a reproducing functional part adapted to reproduce data stored in a disc storage medium;
- a housing containing the recording and reproducing functional part and the reproducing functional part;
- a first microcomputer adapted to control the recording and reproducing functional part;
- a second microcomputer adapted to control the reproducing functional part;
- a display unit adapted to display a display data generated by the first microcomputer and the second microcomputer; and
- a display driver adapted to drive the display unit, wherein the first microcomputer is serially connected to the display driver with a three-state output terminal, wherein the second microcomputer is serially connected to the display driver with a three-state output terminal, wherein the first microcomputer and the second microcomputer are connected such that the second microcomputer receives a mode selection signal output from the first microcomputer, wherein when the first microcomputer determines that the recording and reproducing functional part is selected, the first microcomputer outputs the mode selection signal indicating that the recording and reproducing functional part is selected to the second microcomputer so as to put the three-state output terminal of the second microcomputer in a high impedance state, and outputs the display data to the display driver, and wherein when the first microcomputer determines that the reproducing functional part is selected, the first microcomputer outputs the mode selection signal indicating that the reproducing functional part is selected to the second microcomputer so as to allow the second microcomputer to output the display data to the display driver, and puts the three-state terminal thereof in a high impedance state.

6. The electronic apparatus as claimed in claim 5, further comprising a remote control signal receiving part adapted to receive an infrared signal from a remote controller, wherein the first microcomputer determines that which of the recording and reproducing functional part and the reproducing part is selected by a user based on the infrared signal received by the remote control signal receiving part.

* * * * *